(12) United States Patent
Moreau et al.

(10) Patent No.: US 9,777,243 B2
(45) Date of Patent: Oct. 3, 2017

(54) METHODS FOR OBTAINING CORN OIL FROM MILLED CORN GERM

(71) Applicants: The United States of America, as Represented by the Secretary of Agriculture, Washington, DC (US); Dupont Industrial Bioscience, Palo Alto, CA (US)

(72) Inventors: Robert A. Moreau, Quakertown, PA (US); David Johnston, Wyndmoor, PA (US); Kevin B. Hicks, Malvern, PA (US); Jayarama K. Shetty, Palo Alto, CA (US)

(73) Assignees: The United States of America, as Represented by the Secretary of Agriculture, Washington, DC (US); DANISCO US INC., Palo Alto, CA (US)

( * ) Notice: Subject to any disclaimer, the term of this patent is extended or adjusted under 35 U.S.C. 154(b) by 0 days.

(21) Appl. No.: 14/595,526

(22) Filed: Jan. 13, 2015

(65) Prior Publication Data
US 2016/0201006 A1    Jul. 14, 2016

(51) Int. Cl.
| C11B 1/10 | (2006.01) |
| C11B 1/04 | (2006.01) |
| C11B 1/02 | (2006.01) |

(52) U.S. Cl.
CPC ................ *C11B 1/04* (2013.01); *C11B 1/025* (2013.01)

(58) Field of Classification Search
CPC ........................................................ C11B 1/10
See application file for complete search history.

(56) References Cited

PUBLICATIONS

Moreau et al. "A process for the Aqueous Enzymatic Extraction of Corn Oil form Dry Milled Corn Germ and Enzymatic Wet Milled Corn Germ (E-Germ)" J Am Oil Chem Soc (2009) 86:469-474.*
Majoni et al. "Enzyme Treatments to Enhance Oil Recovery from Condensed Corn Distillers Solubles" J Am Oil Chem Soc (2011) 88:523-532.*
Shetty et al. "Use of Phytases in Ethanol Production from E-Mill Corn Processing" Cereal Chem. 88 (3):223-227.*
Moreau et al. Green Vegetable Oil Processing "Chapter 3. Aqueous Extraction of Corn Oil After Fermentation in the Dry Grind Ethanol Process" AOCS Press, 2013, vol. 1, pp. 53-58.*

* cited by examiner

*Primary Examiner* — Louise W Humphrey
*Assistant Examiner* — Stephen A Perkins
(74) *Attorney, Agent, or Firm* — John D. Fado; G. Byron Stover

(57) ABSTRACT

Methods for obtaining corn oil from milled corn germ (e.g., dry milled corn germ), involving adding water, at least one acidic cellulase, at least one acidic protease, and at least one phytase to milled corn germ to obtain corn oil.

18 Claims, 3 Drawing Sheets
(3 of 3 Drawing Sheet(s) Filed in Color)

METHODS FOR OBTAINING CORN OIL FROM MILLED CORN GERM

BACKGROUND OF THE INVENTION

Methods for obtaining corn oil from milled corn germ (e.g., dry milled corn germ), involving adding water, at least one acidic cellulase, at least one acidic protease, and optionally at least one phytase to milled corn germ to obtain corn oil.

Dry milled corn germ is a coproduct of the dry milling of corn, the process used to make food grade corn meal (with germ removed to extend the shelf life), corn germ, grits (also called flaking grits when used to make corn flakes), and corn bran, most of which are used for ingredients for breakfast cereals and other food products (Duensing, W. J., et al., "Corn Dry Milling: Processes, Products, and Applications, IN Corn Chemistry and Technology, Second Edition, P. J. White and L. A. Johnson, Eds., American Association of Cereal Chemists, Inc., St. Paul, pp 407-448, 2003). Before dry milling the corn is tempered by adding a small amount of moisture (~20%) and then the kernels are gently milled and the three major fractions (endosperm, germ, and bran) are separated by mechanical processes such as aspiration and sieving. This germ contains most of the edible oil found in the corn kernel, and the concentration of oil in the germ is about 16-22% on a dry weight basis. This type of corn germ along with the type of germ produced by the corn wet-milling industry (wet-mill germ) are the source of practically all of the commercial corn oil produced and sold in the world. Most commercial corn oil (about 90%) is produced by hexane extraction and/or mechanical pressing of wet milled corn germ. Corn oil and all other types of edible oils are currently selling at high prices due to the worldwide demand for oils for food, feed, and biofuels production. Recently, producers of fuel ethanol from corn have realized that the oil from their incoming corn feedstock, which traditionally was not recovered and was therefore sold as a component of the distillers dried grain with solubles (DDGS) coproduct, would be a value-added coproduct if it could be economically collected. One process for doing this involves the use of the dry milling process to recover the corn germ from the corn kernel prior to sending the rest of the kernel through the fuel ethanol production process. While this would provide ethanol facilities with an oil-enriched germ, a pressing and/or extraction process is also needed to recover the oil to economically benefit from the germ's full value. Due to the high capital cost and significant regulatory and safety considerations, building a hexane extraction facility is not cost effective for one ethanol plant. For that reason, we have been developing simpler processes based upon "green" aqueous enzymatic oil extraction (AEOE). We previously reported an aqueous enzymatic extraction process to extract corn oil from dry fractionated corn germ using an acidic cellulase and then using an alkaline protease, but both enzymes were used at very high and uneconomical concentrations, 95 kg cellulase/MT germ (DWB) and 95 kg protease Alcalase/MT germ (DWB) (Moreau, R. A., et al., J. Am. Oil Chem. Soc., 86: 469-474 (2009)). The process also required separate reaction times at different pH values to accommodate an acidic cellulase and an alkaline protease.

We have now been able to reduce the levels of enzymes and make the aqueous enzymatic oil extraction process for milled corn germ (e.g., dry milled corn germ) simpler and more economical. This included the use of an acidic protease (for the first time), which could operate under the same pH and conditions as the acidic cellulase and optionally the use of low levels of accessory enzymes, such as phytase, to further improve the process.

SUMMARY OF THE INVENTION

Methods for obtaining corn oil from milled corn germ (e.g., dry milled corn germ), involving adding water, at least one acidic cellulase, at least one acidic protease, and optionally at least one phytase to milled corn germ to obtain corn oil.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
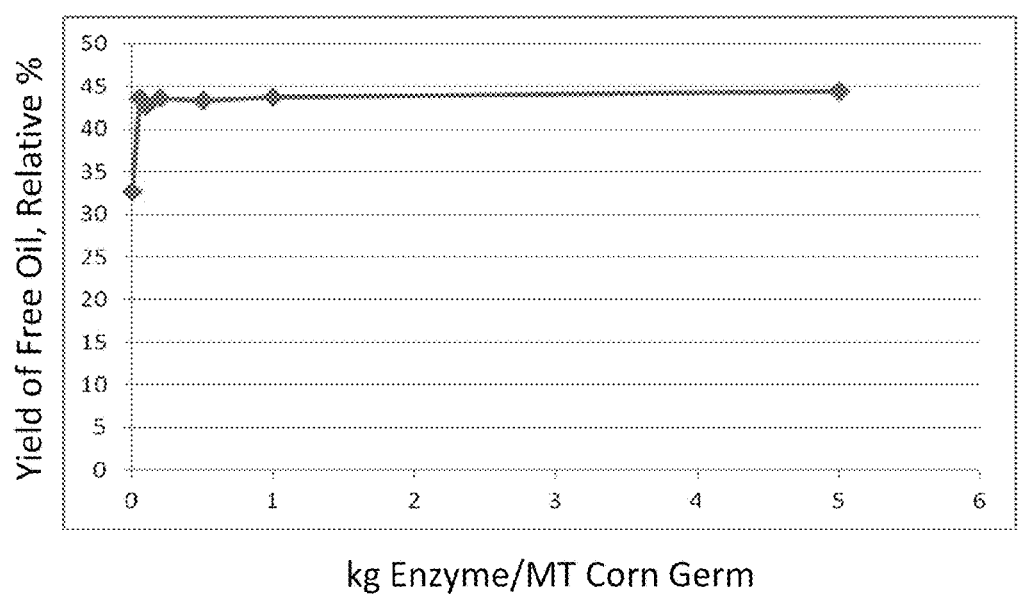
FIG. 1 shows effect of increasing concentration of phytase (OPTIMASH™ Phytase, 0, 0.05, 0.1, 0.2, 0.5, 1.0 and 5.0 kg/MT) with constant concentrations of cellulase (5 kg/MT OPTIFLOW™ RC 2.0 (TM) RC 2.0 and protease (2 kg/MT FERMGEN®) as described below.

Disclosed are methods for obtaining corn oil from milled corn germ (e.g., dry milled corn germ), involving adding water, at least one acidic cellulase, at least one acidic protease, and optionally at least one phytase to milled corn germ in a reactor to obtain corn oil. The resulting corn oil is recovered, for example, by centrifugation and skimming the oil of the top. Preferably at least one phytase is utilized.

The methods could be implemented on a commercial scale by adding the milled corn germ, water and enzymes in a large reactor and mixing them for about 1-40 hours. After mixing, the mixture could be separated in a disc stack centrifuge and the top oil layer removed.

The methods can utilize dry milled corn germ or wet milled corn germ, preferably dry milled corn germ. In a dry milling facility, the germ could be added directly to the reactor after separation. In a wet milling facility, the germ could be added to the reactor following separation but without the need for drying as is necessary for the hexane extraction process.

The methods are generally conducted for about 1 to about 40 hours (e.g., 1-40 hours, preferably about 6 to about 24 hours (e.g., 6-24 hours), more preferably about 20 hours (e.g., 20 hours)) at a temperature of about 25° to about 70° C. (e.g., 25° to 70° C., preferably about 35° to about 60° C. (e.g., 35° to 60° C.), more preferably about 40° to about 55°

C. (e.g., 40° to 55° C.), most preferably about 50° C. (e.g., 50° C.)) and a pH of about 3 to about 6 (e.g., 3 to 6, preferably about 3.5 to about 5.5 (e.g., 3.5 to 5.5), more preferably about 4 to about 5 (e.g., 4 to 5)). The acidic cellulase is any acidic cellulase known in the art, for example, OPTIFLOW™ RC 2.0 or GC220 (both are obtained from *Trichoderma reesei*) or ACCELLERASE® 1500. The acidic proteases are any known acidic protease, for example FERMGEN®. The phytase may be any known phytase, for example OPTIMASH™ Phytase. The methods generally utilise about 1 to about 5 kg acidic cellulase and about 1 to about 5 kg acidic protease per MT milled corn germ and optionally about 0.05 to about 5 kg phytase per MT milled corn germ. Corn oil yields are generally about 15 to about 70% (e.g., 15 to 70%), preferably about 30 to about 70% (e.g., 30 to 70%), more preferably about 40 to about 70% (e.g., 40 to 70%), most preferably about 60 to about 70% (e.g., 60 to 70%).

Unless defined otherwise, all technical and scientific terms used herein have the same meaning as commonly understood by one of ordinary skill in the art to which the invention belongs. As used herein, the term "about" refers to a quantity, level, value or amount that varies by as much as 30%, preferably by as much as 20%, and more preferably by as much as 10% to a reference quantity, level, value or amount. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Dry milled corn germ was obtained from Bunge USA (St. Louis, Mo.) and from Cereal Process Technologies (Overland Park, Kans.). Alcalase® 2.4 (Protease) was obtained from Sigma Chemical (St. Louis, Mo.) and all other enzymes were obtained from DuPont Industrial Biosciences (formerly Genencor), Cedar Rapids, Iowa. All germ samples were dried at 105° C. for 3 hours to determine dry weight and all oil yields were expressed per Metric Ton (MT) of germ on a dry weight basis (DWB).

For hexane extractions, corn germ (1 g) was weighed in a 55 ml glass screw-top tube and 40 ml of hexane was added. The mixture was homogenized for 1 min at medium speed with a Polytron homogenizer (Brinkman Instruments, Westbury, N.Y.). The mixture was shaken horizontally for 1 h at room temperature in a wrist action shaker. Finally, the slurry was filtered through a Whatman Glass Microfiber Filter (GF/A) and evaporated to dryness under $N_2$.

The procedure for 6 gram germ scale aqueous enzymatic extraction of germ with acidic cellulase and acidic protease involved the following: Add samples of corn germ (6 grams) into 50 ml polypropylene centrifuge tubes, add 25 ml distilled water, grind mixture with a Polytron homogenizer (2×1 minute, high speed), add an additional 10 ml of distilled water and then add cellulase and acidic protease, adjust pH to 4.0 with 1 N $H_2SO_4$, "churn" at 50° C. for 20 hours with tubes shaking horizontally at 160 rpm in a rotary incubator/shaker, cool tubes at room temperature for 30-60 min, centrifuge at 2500× g (4000 rpm) for 10 min in a BHG Hermle Z320 centrifuge, remove top oil layer with a pipette, remove the remaining white emulsion-interface (about 1 ml) and centrifuge 10 min at 16,100× g (13,200 rpm) in an Eppendorf microfuge centrifuge 5415 D, remove additional oil from top of microfuge tube, combine with oil from first centrifugation, and measure mass of total oil.

A similar procedure was used for the scale up to 200 grams of corn germ, except that the corn germ and water were placed in a 1 liter polypropylene centrifuge bottle and identical proportions of germ, water, and enzymes were used. After churning, the sample was cooled at room temperature for one hour and the samples were centrifuged for 30 minutes at 2500 g (3500 rpm) in a Sorvall RC-3B Refrigerated Centrifuge with H6000A rotor, set to 40° C. (not so much to heat the samples but to heat the buckets so that the bottles did not distort upon coming in contact with the cool buckets). The oil and interface layers were removed from the 1 L bottles and transferred to 50 ml polypropylene centrifuge tubes (4 tubes per sample). The samples were then centrifuged for 30 minutes at 2500 g (4000 rpm) in a BHG Hermle Centrifuge. The clean oil was removed by decanting, as the pad in each tube was quite solid, and collected. The collected free oil was weighed.

For quantification of total oil (free+emulsified oil), the free oil layer and the entire floating layer of emulsified oil after centrifugation were both removed and transferred to a 55 ml glass screw top tube with Teflon-lined cap. Total lipids were extracted using a hexane-isopropanol-water extraction method (Hara, A., and N. S. Radin, Anal. Biochem., 90: 420-426 (1978)). After centrifugation, the top organic layer was transferred to a pre-weighed glass tube, the solvents were removed via a stream of nitrogen gas, and collected emulsified oil was weighed.

For phytic acid analysis the samples were milled to 20 microns. The sample (1 g) was extracted with 10.0 mL 0.5 M HCl. The high acid concentration ensured complete protonation of all 12 sites on the phytate phosphate groups, thus breaking any chelation forces that cause insolubility or differences in chromatography elution (i.e., converting both the soluble phytate-ion chelation complexes and the insoluble mineral-chelated phytins to the highly soluble phytic acid form). The HPLC analysis method employed an ion chromatography column (Dionex® OmniPac™ PAX-100, 250×4 mm), a gradient with (A) water, (B) 0.2 M NaOH, and (C) 50% isopropanol, and suppressed conductivity detection, at 25° C., with a flow rate of 0.8 ml/min.

All experiments were conducted at least two times with triplicate samples for each experiment. The values reported are mean±SD.

Results and Discussion: The first treatment was designed to simulate the previous report (Moreau et al., 2009) which employed an acidic cellulase concentration of 0.5 ml enzyme/6 grams germ or 95 kg enzyme/MT germ DWB and an alkaline protease concentration of 0.5 ml enzyme/6 grams germ or 95 kg enzyme/MT germ DWB. For the current study however, an updated acidic cellulase (e.g., OPTIFLOW™ RC 2.0, which is essentially the same as GC220 and both are obtained from *Trichoderma reesei*) and a modern acidic protease that was developed for the fuel ethanol industry (Fermgen) was used for the first time, in place of Alcalase®, an alkaline protease. Treatment with high concentrations of cellulase (OPTIFLOW™ RC 2.0, 100 kg/MT) alone resulted in a free oil yield of 45.0% (Table 1). Treatment with high concentrations of cellulase (OPTIFLOW™ RC 2.0, 100 kg/MT) and high concentrations of acid protease (FERMGEN®, 40 kg/MT), surprisingly resulted in a free oil yield of 69.6%, about 10% higher than the optimal oil yield reported with the combination of acidic cellulase and alkaline protease (Moreau et al, 2009). A surprising advantage of this combination of enzymes compared to our previous work (Moreau et al, 2009) was that no separate high pH incubation was needed to accommodate an alkaline protease, which greatly simplifies processing and reduces costs and chemicals for pH changes. Both cellulase and protease in the present study worked well at the same pH range of 4-5.

The concentrations of acidic cellulase and acidic protease were then decreased about 20-fold, to levels that would potentially be more economically feasible for industrial use. With an acidic cellulase concentration of 5 kg enzyme/MT germ and an acidic protease concentration of 2 kg/MT, an oil yield of 40.3% was achieved (Table 1). We then tried adding phytase (at 5 kg/MT) along with the same low concentrations of cellulase and acidic protease and found that the oil yields surprisingly increased about 5% to 45.4%. Because phytase significantly increased oil yields we then analyzed the levels of phytic acid (in the form of IP6) in the two corn germ samples and found that one was comprised of 7.36±0.18% (dwb) and the other 5.00±0.04% (dwb) phytic acids. Phytic acid is indeed a major component in corn germ but it is very surprising that phytic acid may cause a barrier to the aqueous enzymatic extraction of oil from corn germ and that phytase increased oil yields. This discovery provides another useful enzymatic approach to increasing yields of corn oil from dry fractionated corn germ.

The next experiment (FIG. 1) was designed to investigate the effect of changing phytase concentration (0, 0.05, 0.1, 0.2, 0.5, 1.0 and 5.0 kg/MT) while maintaining low concentrations of acidic cellulase and acidic protease (5 kg/MT OPTIFLOW™ RC 2.0 (TM) RC 2.0 and 2 kg/MT FERMGEN®). It was found that phytase concentrations could be reduced as low as 0.05 kg/MT and yields of free oil would surprisingly remain at about 44%. It should be noted that the dry milled germ used in this experiment was from a different lot from that described above and in Table 1. In this case, use of only 5 kg/MT OPTIFLOW™ RC 2.0 (TM) and 2 kg/MT FERMGEN® without phytase gave about 33% oil recovery and addition of 0.05 phytase surprisingly raised the yield by 11% to 44%. In fact, we noted that the oil yields with the same combination of enzymes varied as much as 20% with different batches of dry milled corn germ, perhaps (without being bound by theory) due to different levels of phytic acid in the different batches of dry milled corn germ. While the actual numbers did vary, the experiments consistently showed the surprisingly positive benefits of phytase addition.

Figure 2:
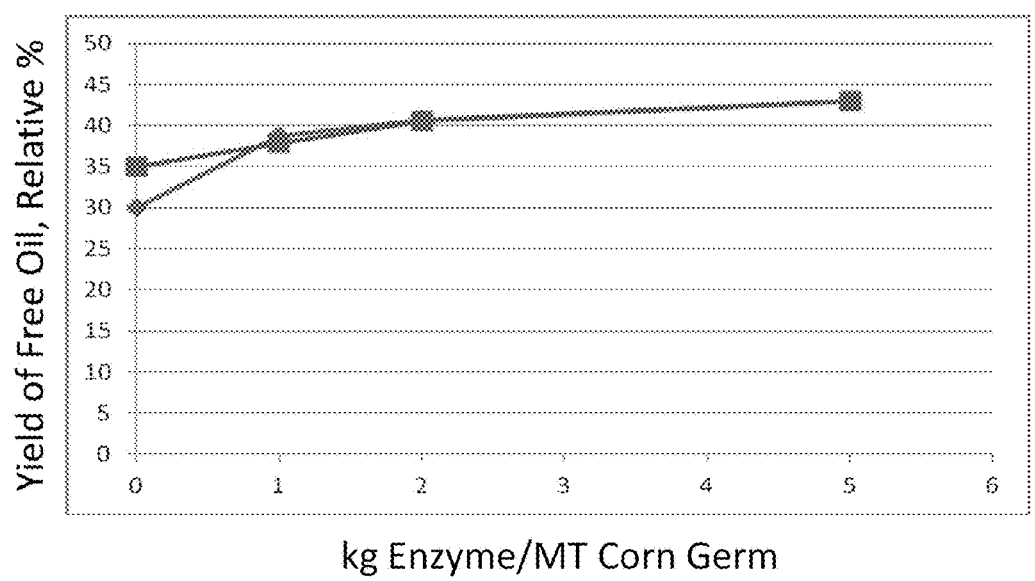
FIG. 2 shows effect of increasing concentration of cellulase (♦ OPTIFLOW™ RC 2.0™ RC 2.0 Optiflow, ■ ACCELLERASE™ 1500) with constant concentrations of protease (2 kg/MT FERMGEN®) and phytase (0.05 KG/MT OPTIMASH™ Phytase) as described below.

The next experiment (FIG. 2) was designed to investigate the effect of changing concentrations of acidic cellulase (OPTIFLOW™ RC 2.0 (TM) and Accelerase 1500) with constant concentrations of acid protease (2 kg/MT FERMGEN®) and phytase (0.05 KG/MT OPTIMASH™ Phytase). Free oil yields of 30-35% were obtained in the absence of acidic cellulase and addition of 1, 2, or 5 kg/MT of both cellulases surprisingly increased oil yields to about 38%, 40% and 43%, respectively.

Figure 3:
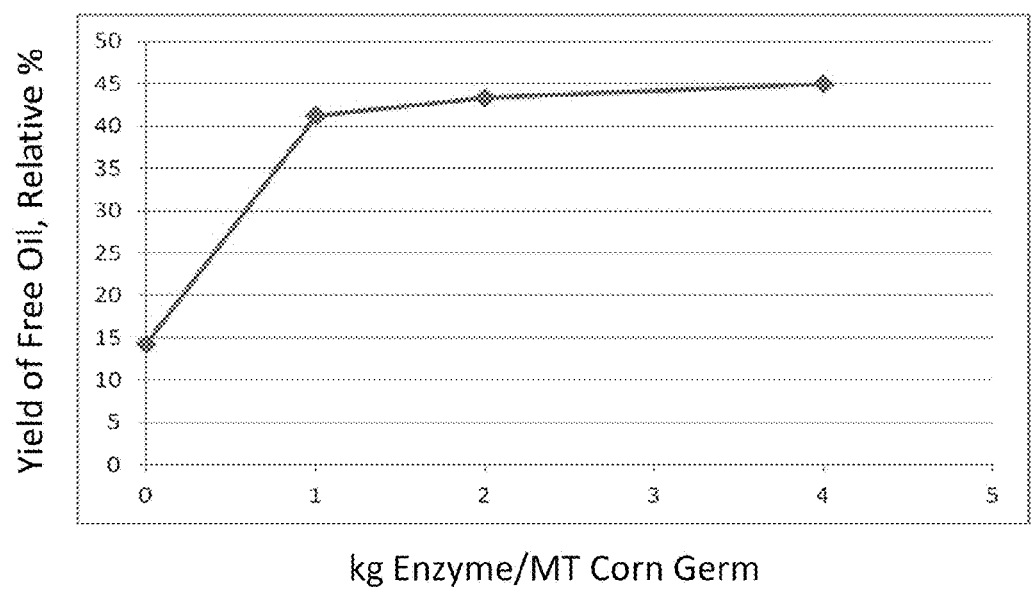
FIG. 3 shows effect of increasing concentration of protease (FERMGEN®) with constant concentrations of cellulase (5 kg/MT OPTIFLOW™ RC 2.0) and phytase (0.2 kg/MT OPTIMASH™ Phytase) as described below.

The next experiment (FIG. 3) was designed to investigate the effect of changing acidic protease (FERMGEN®) concentration with constant concentrations of acidic cellulase (5 kg/MT OPTIFLOW™ RC 2.0) and phytase (0.2 kg/MT OPTIMASH™ Phytase). Free oil yields of about 14% were obtained in the absence of protease and addition of 1, 2, and 5 kg/MT surprisingly increased oil yields to about 41, 44 and 45%. Thus, in this low enzyme concentration range (1-5 kg/MT), surprisingly oil yield is significantly influenced by all three enzymes.

Our results in Table 1 indicated that high yields of free oil (~70%) could surprisingly be achieved with high concentrations of enzymes, but all combinations of enzymes at concentrations that may be economically feasible (1-5 kg/MT range) resulted in oil yields in the 40-50% range. Therefore, our final experiment was designed to investigate whether the low concentrations of enzymes were causing low oil yields because the corn oil was not being released from the lignocellulosic matrix (the "pellet" after centrifugation) or because the corn oil was not being released from emulsified oil to generate free oil (Table 2). Other researchers who have published aqueous enzymatic oil extraction processes for soybean and rapeseed have reported that the first aqueous enzymatic step released oil from the lignocellulosic matrix into an emulsion that floated after centrifugation and a second "demulsification" step was necessary to transform the emulsified oil into free oil (Lamsal, B. P., et al., J. Am. Oil Chem. Soc., 83: 973-979 (2006); Lamsal, B. P., and L. A. Johnson, J. Am. Oil Chem. Soc., 84: 785-792 (2007); Zhang, S. B., et al., J. Am. Oil Chem. Soc., 84: 97-105 (2007a); Zhang, S. G., et al., J. Am. Oil Chem. Soc., 84: 693-700 (2007b)).

We have also recently observed that a second demulsification step was necessary to release oil (in the free oil form) from emulsified oil in wheat germ, barley germ, and rice bran (Xuezhi Fang, et al., J. Am. Oil Chem. Soc., 91: 1261-1268, 2014). In all previous experiments in this report and in our previous two publications on AEOE of corn germ, only free oil was measured (Moreau, R. A., et al., J. Am. Oil Chem. Soc., 81: 1071-1075 (2004); Moreau et al. 2009). In this experiment both free oil and total oil (free oil and emulsified oil) were measured. Free oil was measured by removing it from the top after centrifugation as described. Total oil (free oil and emulsified oil) was measured by removing both from the top of the tube after centrifugation and extracting all of the lipids from both layers with a hexane-isopropanol extraction method (Hara and Radin, 1978). Treatment with high concentration of acidic cellulase (100 kg/MT) alone resulted in an emulsified oil yield of about 59% and a free oil yield of 12%, so about 80% of the oil liberated from the pellet remained in the emulsion. Addition of a high concentration of acidic protease (FERMGEN®, 40 kg/MT) to the acidic cellulase surprisingly increased the yield of total oil to about 76% and increased the yield of free oil to about 62%, suggesting that the addition of acidic protease caused more oil to be liberated from the pellet and caused most of the oil in the emulsion to be released as free oil. With a low concentration of acidic cellulase (5 kg/MT) alone the yield of emulsified oil was about 48% and there was no free oil. When low concentrations of acidic protease (2 kg/MT) and phytase (0.05 kg/MT) were added to the low concentration of acidic cellulase (5 kg/MT), the yield of emulsified oil increased slightly to about 48% and the yield of free oil surprisingly increased to about 34%.

These experiments suggest that the major contribution of the acidic cellulase (especially at low concentrations) was to liberate oil from the pellet into the emulsion layer and the major contribution of the acidic protease was to release oil from the emulsion layer into the free oil layer. It also indicated that when low yields of free oil are observed during treatment of dry milled corn germ with low concentrations of two or three enzymes, about 50% of the oil is still associated with the lignocellulosic pellet. It should be noted that the yields of free oil with both high and low concentrations of enzymes were lower in this experiment than in previous experiments. Without being bound by theory, we think that the lower yields of free oil were because a different batch of dry milled corn germ was used for this study. Clearly there is considerable lot to lot variability in the dry mill germ produced from different corn millers using different processes. This variability will have to be managed in any AEOE process developed in the future. The knowledge gained in these experiments help define the specific roles that various enzymes play in AEOE and will be useful in future experiments designed to further reduce enzyme levels and increase free oil yields. We anticipate that the economics of our aqueous enzymatic oil extraction process will be improved further by recycling the enzymes, and we intend to investigate this topic in the near future.

In conclusion, we previously reported an aqueous enzymatic extraction process to extract corn oil from dry fractionated corn germ using a high concentration of an acidic cellulase and second step with a high concentration of an alkaline protease. In the current study we report a simpler one step process, which used both an acidic cellulase and an acidic protease to extract corn oil from dry fractionated corn germ. At high concentrations of cellulase and protease, we surprisingly achieved free oil yields of 70-75% and at low enzyme concentrations (1-5 KG of enzyme/MT germ) we achieved free oil yields of about 40-45%. We also surprisingly demonstrated for the first time a significant increase in aqueous enzymatic free oil yields upon the addition of a very low concentration of phytase (0.05 kg enzyme/MT germ).

All of the references cited herein, including U.S. Patents, are incorporated by reference in their entirety. Also incorporated by reference in their entirety are the following references: Dickey, L., et al., J. Am. Oil Chem. Soc., 84: 489-495 (2007); Johnston, D. B., et al., J. Am. Oil Chem. Soc., 82: 603-608 (2005); Moreau, R. A., et al., Johnston, D., et al., Aqueous enzymatic oil extraction: A "Green" bioprocess to obtain oil from corn germ and other oil-rich plant materials, IN: Eggleston, G., and J. R. Vercellotti (eds), The industrial application of enzymes on carbohydrate based materials, AOCS Press, pp 101-120, 2007.

Thus, in view of the above, there is described (in part) the following:

A method for obtaining corn oil from milled corn germ, comprising (or consisting essentially of or consisting of) adding water, at least one acidic cellulase, at least one acidic protease, and optionally at least one phytase to said dry milled corn germ to obtain corn oil.

The above method, wherein said method is conducted for about 1 to about 40 hours.

The above method, wherein said method is conducted at about 25° to about 70° C. The above method, wherein said method is conducted at about 35° to about 60° C. The above method, wherein said method is conducted at about 40° to about 55° C. The above method, wherein said method is conducted at about 50° C.

The above method, wherein said method is conducted at a pH of about 3 to about 6. The method, wherein said method is conducted at a pH of about 3.5 to about 5.5. The above method, wherein said method is conducted at a pH of about 4 to about 5.

The above method, wherein said method utilizes about 1 to about 5 kg acidic cellulase and about 1 to about 5 kg acidic protease per MT milled corn germ and optionally about 0.05 to about 5 kg phytase per MT milled corn germ.

The method, wherein said method utilizes at least one phytase.

The above method, wherein said method utilizes about 1 to about 5 kg acidic cellulase and about 1 to about 5 kg acidic protease per MT milled corn germ and about 0.05 to about 5 kg phytase per MT milled corn germ.

The above method, wherein said milled corn germ is selected from the group consisting of dry milled corn germ, wet milled corn germ, and mixtures thereof. The above method, wherein said milled corn germ is dry milled corn germ.

The above method, wherein the yield of corn oil is about 15 to about 70%. The above method, wherein the yield of corn oil is about 30 to about 70%. The above method, wherein the yield of corn oil is about 40 to about 70%. The above method, wherein the yield of corn oil is about 60 to about 70%. The above method, wherein the yield of corn oil is at least about 70%.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

A comparison of high dosages and 20x lower dosages of cellulase (OPTIFLOW ™ RC 2.0), protease (Alcalase ® and FERMGEN ®) and phytase (OPTIMASH ™ Phytase) on oil yields obtained from dry milled corn germ.

| Cellulase, Acidic (OPTIFLOW ™ RC 2.0) (kg/MT) | Protease, Alkaline (Alcalase ®) (kg/MT) | Protease, Acidic (FERMGEN ®) (kg/MT) | Phytase, Acidic (OPTIMASH ™ Phytase) (kg/MT) | Yield of Free Oil relative % |
|---|---|---|---|---|
| 95 | 95 | 0 | 0 | 59.5* |
| 100 | 0 | 0 | 0 | 45.0 |
| 100 | 0 | 40 | 0 | 69.6 |
| 5 | 0 | 2 | 0 | 40.3 |
| 5 | 0 | 2 | 5 | 45.4 |

*These are the concentrations of cellulase (acidic) and protease (alkaline) used in the previous publication (Moreau et al, 2009).

TABLE 2

A comparison of yields of emulsified oil and free oil with high and low concentrations of cellulase (OPTIFLOW™ RC 2.0) and protease (FERMGEN ®).

| Cellulase (OPTIFLOW™ RC 2.0) (kg/MT) | Acidic Protease (FERMGEN ®) (kg/MT) | Phytase (OPTIMASH™ Phytase) (kg/MT) | Yield of Free + Emulsified Oil (relative %) | Yield of Free Oil, (relative %) |
|---|---|---|---|---|
| 100 | 0 | | 59.06 ± 9.33 | 12.04 ± 5.83 |
| 100 | 40 | | 75.86 ± 2.17 | 62.05 ± 1.10 |
| 5 | 0 | | 43.90 ± 5.07 | 0 |
| 5 | 2 | 0.05 | 47.99 ± 2.27 | 33.89 ± 1.54 |

We claim:

1. A method for obtaining corn oil from milled corn germ, comprising adding water, at least one acidic cellulase, at least one acidic protease, and at least one phytase to said milled corn germ to obtain corn oil; wherein the only enzymes utilized in said method are at least one acidic cellulase, at least one acidic protease and at least one phytase.

2. The method according to claim 1, wherein said method is conducted for about 1 to about 40 hours.

3. The method according to claim 1, wherein said method is conducted at about 25° to about 70° C.

4. The method according to claim 1, wherein said method is conducted at about 35° to about 60° C.

5. The method according to claim 1, wherein said method is conducted at about 40° to about 55° C.

6. The method according to claim 1, wherein said method is conducted at about 50° C.

7. The method according to claim 1, wherein said method is conducted at a pH of about 3 to about 6.

8. The method according to claim 1, wherein said method is conducted at a pH of about 3.5 to about 5.5.

9. The method according to claim 1, wherein said method is conducted at a pH of about 4 to about 5.

10. The method according to claim 1, wherein said method utilizes about 1 to about 5 kg acidic cellulase per Metric Ton (MT) milled corn germ and about 1 to about 5 kg acidic protease per MT milled corn germ and about 0.05 to about 5 kg phytase per MT milled corn germ.

11. The method according to claim 1, wherein said milled corn germ is selected from the group consisting of dry milled corn germ, wet milled corn germ, and mixtures thereof.

12. The method according to claim 1, wherein said milled corn germ is milled corn germ.

13. The method according to claim 1, wherein the yield of corn oil is about 15 to about 70%.

14. The method according to claim 1, wherein the yield of corn oil is about 30 to about 70%.

15. The method according to claim 1, wherein the yield of corn oil is about 40 to about 70%.

16. The method according to claim 1, wherein the yield of corn oil is about 60 to about 70%.

17. The method according to claim 1, said method consisting essentially of adding water, at least one acidic cellulase, at least one acidic protease, and at least one phytase to said milled corn germ to obtain corn oil.

18. The method according to claim 1, said method consisting of adding water, at least one acidic cellulase, at least one acidic protease, and at least one phytase to said milled corn germ to obtain corn oil.

* * * * *